US007753337B2

(12) United States Patent
Suzuki et al.

(10) Patent No.: US 7,753,337 B2
(45) Date of Patent: Jul. 13, 2010

(54) FLUID INJECTION VALVE

(75) Inventors: Yoshihito Suzuki, Toyokawa (JP); Moriyasu Goto, Toyohashi (JP); Toyoji Nishiwaki, Anjo (JP)

(73) Assignees: Denso Corporation, Kariya (JP); Nippon Soken, Inc., Nishio (JP)

( * ) Notice: Subject to any disclaimer, the term of this patent is extended or adjusted under 35 U.S.C. 154(b) by 596 days.

(21) Appl. No.: 11/783,433

(22) Filed: Apr. 9, 2007

(65) Prior Publication Data

US 2007/0235669 A1 Oct. 11, 2007

(30) Foreign Application Priority Data

Apr. 10, 2006 (JP) ............................ 2006-107255

(51) Int. Cl.
*F16K 31/02* (2006.01)

(52) U.S. Cl. ............................ 251/129.15; 239/585.5; 239/585.1

(58) Field of Classification Search ............ 251/129.15; 239/585.1, 585.2, 585.3, 585.4, 585.5
See application file for complete search history.

(56) References Cited

U.S. PATENT DOCUMENTS 5,127,585 A * 7/1992 Mesenich ................ 239/585.5
5,961,097 A * 10/1999 Zimmermann ......... 251/129.19
6,161,813 A 12/2000 Baumgartner et al.
6,279,873 B1 8/2001 Eichendorf et al.
6,367,769 B1 * 4/2002 Reiter .................. 251/129.19
6,799,734 B1 10/2004 Hans
7,175,114 B2 2/2007 Hans
7,273,186 B2 * 9/2007 Kubo et al. .................. 239/88

FOREIGN PATENT DOCUMENTS

JP 2005-171845 6/2005
JP 2006-057641 3/2006

OTHER PUBLICATIONS

Japanese Office Action dated Jan. 7, 2010, issued in corresponding Japanese Application No. 2006-107255, with English translation.

* cited by examiner

*Primary Examiner*—John K Fristoe, Jr.
(74) *Attorney, Agent, or Firm*—Nixon & Vanderhye PC

(57) ABSTRACT

In a fluid injection valve, a valve needle and a moving core are installed in the valve housing to be slidable in an axial direction. The moving core has a through hole in which the valve needle is slidably inserted. A stopper provided on the valve needle moves the valve needle integrally with the moving core when the moving core travels toward the fixed core with respect to the needle valve. An elastic member biases the valve needle away from the fixed core, and a helical spring biases the moving core toward the fixed core. A spring seat supports one axial end of the helical spring in both of the axial direction and a radial direction of the helical spring.

1 Claim, 7 Drawing Sheets

FLUID INJECTION VALVE

CROSS REFERENCE TO RELATED APPLICATION

This application is based upon and claims the benefit of priority of Japanese Patent Application No. 2006-107255 filed on Apr. 10, 2006, the contents of which is incorporated herein by reference.

FIELD OF THE INVENTION

The present invention relates to a fluid injection valve suitable for injecting fuel into cylinders of an internal combustion engine.

BACKGROUND OF THE INVENTION

Conventionally, a fuel injection valve that starts and stops fuel injection out of an injection hole by using magnetic attraction force generated by energizing a coil is put into practice. In this kind of fuel injection valve, when the coil, for example, is energized, a magnetic attraction force is generated between a fixed core and a moving core. A valve member is integrated with the moving core, and the magnetic attraction force moves the valve member and the moving core in an axial direction. The moving core and the valve member collides with the fixed core not to move further, and a position of the valve member when the fuel injection is performed is determined by an arrangement of the fixed core. In this case, the moving core, which is integrated with the valve member, collides with the fixed core, so that the moving core rebounds apart from the fixed core due to an impact of the collision. Thus, the fuel injection lags behind the energization of the coil, and a responsivity of the fuel injection valve becomes worse. As a result, it becomes difficult to control an injection quantity of the fuel injected out of the injection hole with high accuracy.

In this regard, U.S. Pat. Nos. 6,161,813, 6,279,873, 6,367,769 and their counterparts JP-2000-509787-A, JP-2002-506502-A, JP-2002-528672-A disclose a fuel injection valve having a construction in which the valve member is formed separately from the moving core.

As disclosed in the above-listed documents, when the valve body is formed separately from the moving core, an elastic member is necessary to push one of the valve member and the moving core onto the other so as to move the valve member together with the moving core. If the elastic member is deformed not in an axial direction in which the elastic member generates its restoring force, a magnitude of the restoring force is deviated from standard restoring force. Thus, a guide for preventing the elastic member from being inclined and bent with respect to the axial direction of the elastic member is necessary. However, when a member for the guide is added, the number of parts and assembly processes of the fuel injection valve are increased.

SUMMARY OF THE INVENTION

The present invention is achieved in view of the above-described issues, and has an object to provide a fluid injection valve that can control a fuel injection quantity with high accuracy with relatively small numbers of parts and assembly processes of the fuel injection valve.

The fluid injection valve has a valve housing, a valve needle, a fixed core, a moving core, a coil, a stopper, an elastic member, a helical spring, and a spring seat. The valve needle is installed in the valve housing to be slidable in an axial direction thereof. The fixed core is fixed to the valve housing. The moving core is installed in the valve housing to be slidable in the axial direction and provided with a through hole in which the valve needle is slidably inserted. The coil is fixed to the valve housing to generate magnetic force to attract the moving core toward the fixed core when it is energized. The stopper is provided on a circumference of the valve needle at a position between the fixed core and the moving core. The stopper comes in contact with the moving core to move the valve needle integrally with the moving core when the moving core travels toward the fixed core with respect to the needle valve. The elastic member generates a biasing force in the axial direction to bias the valve needle away from the fixed core. The helical spring generates a biasing force in the axial direction to bias the moving core toward the fixed core. The biasing force generated by the helical spring is smaller than the biasing force generated by the elastic member. The spring seat supports one axial end of the helical spring, which is opposite from the moving core, in both of the axial direction and a radial direction of the helical spring.

BRIEF DESCRIPTION OF THE DRAWINGS

Features and advantages of embodiments will be appreciated, as well as methods of operation and the function of the related parts, from a study of the following detailed description, the appended claims, and the drawings, all of which form a part of this application. In the drawings:

DETAILED DESCRIPTION OF PREFERRED EMBODIMENTS

Figure 1:
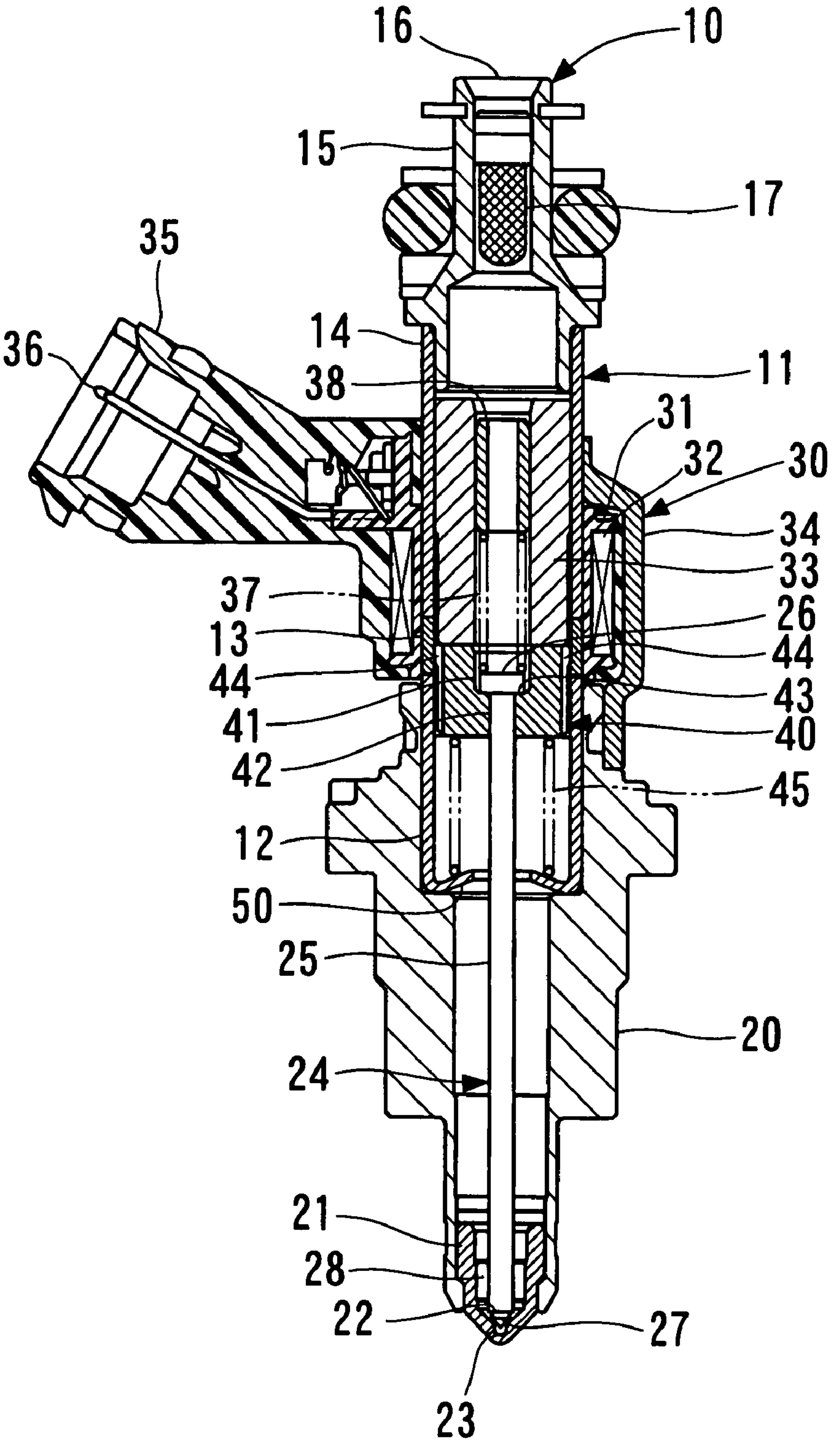
FIG. 1 is a cross-sectional view showing a fluid injection valve according to a first embodiment of the present invention.

In the following are described fluid injection valves according to several embodiments of the present invention, referring to the drawings.

First Embodiment

FIG. 1 depicts a fuel injection valve (fluid injection valve) 10 according to first embodiment of the present invention. The fuel injection valve 10 according to the first embodiment is applied to a direct-injection gasoline engine, for example; however, the fuel injection valve 10 can be applied also to port-injection gasoline engines, to diesel engines, etc. When the fuel injection valve 10 is applied to a direct-injection gasoline engine, the fuel injection valve 10 is mounted on an engine head (not shown).

A cylindrical member 11, which serves as a housing of the fuel injection valve 10, has a cylindrical shape having a generally constant inner diameter over its longitudinal length. The cylindrical member 11 includes a first magnetic portion 12, a nonmagnetic portion 13 and a second magnetic portion 14. The nonmagnetic portion 13 prevents a magnetic short circuit between the first magnetic portion 12 and the second magnetic portion 14. The first magnetic portion 12, the nonmagnetic portion 13 and the second magnetic portion 14 is integrally connected with each other by laser welding, for example. Alternatively, the cylindrical member 11 may be integrally formed and partially magnetized or demagnetized by heating process, etc.

An inlet member 15 is installed on one axial end side of the cylindrical member 11. The inlet member 15 is press-fitted to an inner circumference of the cylindrical member 11. The inlet member 15 has a fuel inlet 16. Fuel is supplied to the fuel inlet 16 from a fuel pump (not shown). The fuel supplied to the fuel inlet 16 further flows through a fuel filter 17 into an inside of the cylindrical member 11. The fuel filter 17 removes foreign matters contained in the fuel.

A nozzle holder 20 is installed on the other axial end side of the cylindrical member 11. The nozzle holder 20 has a generally cylindrical shape. A nozzle body 21 is installed inside the nozzle holder 20. The nozzle body 21 has a cylindrical shape, and fixed to the nozzle holder 20 by press-fitting, welding, etc. The nozzle body 21 has a valve seat 22 on its inner circumferential surface, an inner diameter of which gradually decreases as going toward a leading end of the nozzle body 21. The nozzle body 21 has an injection hole 23 in a proximity of its leading end that is on an opposite side from the cylindrical member 11. The injection hole 23 penetrates the nozzle body 21 so as to communicate an inside and an outside of the nozzle body 21.

A nozzle needle 24 is installed inside the cylindrical member 11, the nozzle holder 20 and the nozzle body 21 to be able to reciprocate in an axial direction of the fuel injection valve 10. The nozzle needle 24 is arranged approximately coaxially with the nozzle body 21. The nozzle needle 24 has a shaft portion 25, a head portion 26 and a seal portion 27. The nozzle needle 24 has the head portion 26 on one axial end side of the shaft portion 25, that is, on a fuel inlet (16)-side of the shaft portion 25. The nozzle needle 24 has the seal portion 27 on the other axial end side of the shaft portion 25, that is, on a counter fuel inlet (16)-side of the shaft portion 25. The seal portion 27 is seated on and lifted off the valve seat 22 that is provided in the nozzle body 21. The nozzle needle 24 and the nozzle body 21 form a fuel passage 28 therebetween in which the fuel flows.

The fuel injection valve 10 has an electromagnetic actuator 30 for actuating the nozzle needle 24. The electromagnetic actuator 30 has a spool 31, a coil 32, a fixed core 33, a magnetic plate 34 and a moving core 40. The spool 31 is installed on an outer circumferential side of the cylindrical member 11. The spool 31 is made of resin and has a generally cylindrical shape. The coil 32 is wound on an outer circumferential surface of the spool 31. The coil 32 is electrically connected to a terminal portion 36 of a connector 35. The fixed core 33 is installed inside the coil 32 so as to sandwich the cylindrical member 11 between the coil 32 and the fixed core 33. The fixed core 33 is made of magnetic material such as iron. The fixed core 33 has a cylindrical shape, and is fixed to an inner circumference of the cylindrical member 11 by press-fitting, etc. The magnetic plate 34 is made of magnetic material, and covers an outer circumferential surface of the coil 32.

The moving core 40 is installed inside the cylindrical member 11 to be able to reciprocate in the axial direction. The moving core 40 is made of magnetic material such as iron, and has a cylindrical shape. A spring 37, which serves as a first elastic member according to the present invention, pushes a fixed core (33)-side of the moving core 40. One axial end portion of the spring 37 is in contact with the nozzle needle 24. The other axial end portion of the spring 37 is in contact with an adjusting pipe 38. The spring 37 generates a biasing force to extend itself in the axial direction. Thus, the spring 37 pushes the moving core 40 and the nozzle needle 24 in a direction to seat the nozzle needle 24 on the valve seat 22. The adjusting pipe 38 is press-fitted to an inner circumference of the fixed core 33. Thus, the biasing force of the spring 37 is adjusted in accordance with a press-fitting depth of the adjusting pipe 38. When the coil 32 is not energized, the moving core 40 and the nozzle needle 24 are pushed toward the valve seat 22, and the seal portion 27 is seated on the valve seat 22.

As described above, the electromagnetic actuator 30 has the fixed core 33 and the moving core 40. The nozzle needle 24 is inserted into the moving core 40. The moving core 40 has a through hole in a radially central portion, which penetrates the moving core 40 in the axial direction. The through hole has a large diameter portion 41 on a fixed core (33)-side and a small diameter portion 42 on a counter fixed core (33)-side. Thus, the moving core 40 is provided with a step portion between the large diameter portion 41 and the small diameter portion 42 of the through hole. An inner diameter of the small diameter portion 42 of the through hole of the moving core 40 is slightly larger than an outer diameter of the shaft portion 25 of the nozzle needle 24. Thus, the nozzle needle 24 can slide in the through hole of the moving core 40 in the axial direction. In the present embodiment, the nozzle needle 24 slides on an inner circumferential surface of the small diameter portion 42 of the through hole of the moving core 40. Thus, the moving core 40 guides a motion of nozzle needle 24 in the axial direction.

An outer diameter of the head portion 26 of the nozzle needle 24 is larger than the inner diameter of the small diameter portion 42 of the through hole of the moving core 40. Thus, the head portion 26 of the nozzle needle 24 comes in contact with the step portion 43 of the moving core 40. A contact of the head portion 26 with the step portion 43 limits relative motions of the moving core 40 and the nozzle needle 24, that is, a relative motion of the nozzle needle 24 toward the valve seat 22 and a relative motion of the moving core 40 toward the fixed core 33. Thus, the head portion 26 of the nozzle needle 24 serves as a stopper that prevents an excessive relative motion of the moving core 40 and the nozzle needle 24.

An outer circumferential surface of the moving core 40 and an inner circumferential surface of the cylindrical member 11 form a fuel passage 44. The fuel passage 44 extends discontinuously along a circumference of the moving core 40. Thus, the fuel passed through an inside of the fixed core 33 flows through the fuel passage 44 between the moving core 40 and the cylindrical member 11 to the injection hole 23. A radially outer end of the moving core 40 is in contact with the inner circumferential surface of the cylindrical member 11 in a region except for the fuel passage 44. A contact of the moving core 40 with the cylindrical member 11 guides a motion of the moving core 40 in the axial direction.

A counter fixed core (33)-side end of the moving core 40 is in contact with a spring 45, which serves as a second elastic member according to the present invention. One axial end portion of the spring 45 is in contact with the moving core 40. The other axial end portion of the moving core 40 is in contact with the cylindrical member 11. An axial end portion of the cylindrical member 11, which is opposite from the inlet member 15, is bent radially inward. The cylindrical member 11 has a spring seat 50 on the axial end portion opposite from the inlet member 15, i.e., on an injection hole (23)-side end portion. The spring seat 50 is in contact with the spring 45. A counter fixed core (33)-side end portion of the cylindrical member 11 is bent radially inward, to provide a protruding portion that protrudes radially inward and toward the fixed core 33. An outer diameter of the spring seat 50 gradually decreases as going from the injection hole (23)-side end portion toward the fixed core 33. That is, the spring seat 50 has an approximately conical shape that is tapered down as going from the injection hole (23)-side end portion toward the fixed core 33. Thus, a counter moving core (40)-side end portion of the spring seat 50 is inserted into an inner circumference of the spring 45.

By inserting the spring seat 50 into the inner circumference of the spring 45, it is possible to prevent the spring 45 from being inclined and bent with respect to the inner circumference of the cylindrical member 11. When the spring 45 is subjected to inclination and/or bending, an accuracy of a biasing force of the spring 45 decreases. By inserting the spring seat 50 of the cylindrical member 11 into the spring 45 as in the present embodiment, the spring 45 is kept in a constant bearing. Further, it is not necessary to provide the fuel injection valve 10 with a special member for maintaining the bearing of the spring 45. Accordingly, it is possible to maintain the accuracy of the biasing force of the spring 45 without increasing parts nor working processes of the fuel injection valve 10.

The spring 45 generates a force to extend itself in its axial direction. Thus, the moving core 40 is pushed toward the fixed core 33. The moving core 40 is subjected to a biasing force f1 toward the valve seat 22, which is exerted by the spring 37 and transmitted via the nozzle 24, and a biasing force f2 toward the fixed core 33, which is exerted by the spring 45. The biasing force f1 of the spring 37 is larger than the biasing force f2 of the spring 45. Thus, when the coil 32 is not energized, the nozzle needle 24, which is in contact with the spring 37, is moved against the biasing force f2 of the spring 45 toward the injection hole 23, together with the moving core 40, which is in contact with the head portion 26. As a result, when the coil 32 is not energized, the seal portion 27 of the nozzle needle 24 is seated on the valve seat 22.

An operation of the fuel injection valve 10, which has the above-described construction, is described in the following.

Figure 2A:
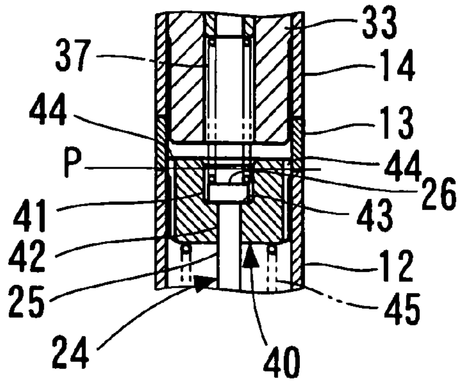
FIGS. 2A to 2D are cross-sectional views showing motions of a moving core and a nozzle needle of the fluid injection valve according to the first embodiment.

When the coil 32 is not energized, no magnetic attraction force is generated between the fixed core 33 and the moving core 40. Thus, as described above, the nozzle needle 24 is moved by the biasing force f1 of the spring 37 away from the fixed core 33. Accordingly, as shown in FIG. 2A, the moving core 40 is apart from the fixed core 33. At this time, the head portion 26 of the nozzle needle 24 is in contact with the step portion 43 of the moving core 40. Thus, the moving core 40 is moved away from the fixed core 33 together with the nozzle needle 24 by the biasing force f1 of the spring 37. By a travel of the nozzle needle 24 away from the fixed core 33, the seal portion 27 of the nozzle needle 24 is seated on the valve seat 22. Thus, the fuel is not injected out of the injection hole 23.

When the coil 32 is energized, due to a magnetic field generated by the coil 32, magnetic flux passes through the magnetic plate 34, the first magnetic portion 12, the moving core 40, the fixed core 33 and the second magnetic portion 14, to form a magnetic circuit. Accordingly, a magnetic attraction force is generated between the fixed core 33 and the moving core 40. When a resultant of the magnetic attraction force generated between the fixed core 33 and the moving core 40, and the biasing force f2 of the spring 45 becomes larger than the biasing force f1 of the spring 37, the moving core 40 moves toward the fixed core 33. At this time, the nozzle needle 24, which is in contact with the step portion 43 of the moving core 40 at the head portion 26, moves together with the moving core 40 toward the fixed core 33. As a result, the seal portion 27 of the nozzle needle 24 is lifted off the valve seat 22.

The fuel flown from the fuel inlet 16 to an inside of the fuel injection valve 10, passes through the fuel filter 17, an inside of the inlet member 15, an inside of the adjusting pipe 38, the fuel passage 44 provided on the outer circumferential surface of the moving core 40, an inside of the cylindrical member 11, and an inside of the nozzle holder 20, and flows into the fuel passage 28 of the nozzle body 21. The fuel flown into the fuel passage 28 passes through a gap between the nozzle body 21 and the nozzle needle 24, which is lifted off the valve seat 22, and flows into the injection hole 23. Thus, the fuel is injected out of the injection hole 23.

In this manner, the moving core 40 is subjected not only to the magnetic attraction force but also to the biasing force f2 of the spring 45. Thus, when the coil 32 is energized, the magnetic attraction force, which is generated between the fixed core 33 and the moving core 40, moves the moving core 40 and the nozzle needle 24 rapidly toward the fixed core 33. Accordingly, a response performance of the nozzle needle 24 against energization of the coil 32 is improved. Further, a magnetic attraction force that is necessary to actuate the moving core 40 and the nozzle needle 24 is reduced. Thus, it is possible to downsize the electromagnetic actuator 30 such as the coil 32.

Figure 2B:
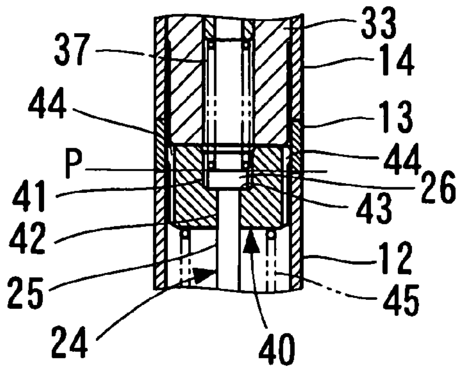
Figure 2C:
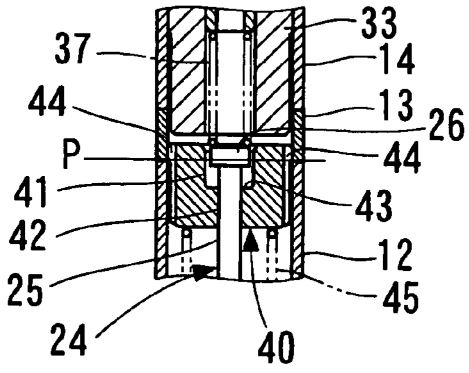

The moving core 40 and the nozzle needle 24 integrally move toward the fixed core 33 by the contact of the step portion with the head portion 26. Then, as shown in FIG. 2B, the moving core 40 moves toward the fixed core 33 until it collides with the injection hole (23)-side end portion of the fixed core 33. When the moving core 40 collides with the fixed core 33, the moving core 40 rebounds apart from the fixed core due to an impact of the collision, as shown in FIG. 2C. In the present embodiment, the moving core 40 and the nozzle needle 24 can move relative to each other in the axial direction. Thus, the moving core 40 rebounds toward the injection hole 23 by the impact of the collision with the fixed core 33; however, the nozzle needle 24 continue to move toward the fixed core 33 due to inertia. Accordingly, a rebounding degree of the nozzle needle 24 is decreased, so as to reduce irregular fuel injections out of the injection hole 23. In FIGS. 2A-2D, referential symbol "P" indicates a position of the head portion 26 of the nozzle needle 24 when the injection hole 23 is kept opened.

Further, when the moving core 40 rebounds toward the injection hole 23 to separate the moving core 40 from the nozzle needle 24, the nozzle needle 24 is not subjected to the biasing force f2 of the spring 45, which is transmitted via the moving core 40. Then, the nozzle needle 24 is subjected only to the biasing force f1 of the spring 37. That is, when the moving core 40 rebounds, and the moving core 40 is separated from the nozzle needle 24, a force to move the nozzle needle 24 toward the injection hole 23 increases. Accordingly, the nozzle needle 24 is limited from traveling excessively toward the fixed core 33, so as to reduce a degree of an overshoot.

Figure 2D:
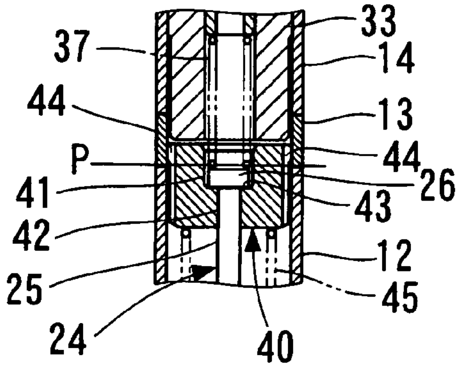

When the nozzle needle 24 is subjected only to the biasing force f1 of the spring 37, the nozzle needle 24 is hindered from traveling toward the fixed core 33, and starts moving toward the injection hole 23. The moving core 40, which has rebound toward the injection hole 23, moves again toward the fixed core 33 by the magnetic attraction force between the moving core and the fixed core 33 and the biasing force f2 of the spring 45. Accordingly, when the nozzle needle 24 moves toward the injection hole 23, the moving core 40, which is moving toward the fixed core 33, limits a movement of the nozzle needle 24 toward the injection hole 23, as shown in FIG. 2D. As a result, the nozzle needle 24 moves toward the fixed core 33 together with the moving core 40, so that a movement of the moving core 40 and a movement of the nozzle needle 24 cancel with each other. In this manner, the moving core 40 and the nozzle needle 24 can move relative to each other, so as to reduce the irregular fuel injections out of the injection hole 23 due to a bounce of the nozzle needle 24. Accordingly, even when an energizing time of the coil 32 is short, it is possible to control injection quantity of the fuel, which is injected out of the injection hole 23, with high accuracy.

When the coil 32 stops being energized, the magnetic attraction force between the fixed core 33 and the moving core 40 extinguishes. Accordingly, the nozzle needle 24 moves toward the injection hole 23 together with the moving core 40 by the biasing force f1 of the spring 37. Accordingly, the seal portion 27 of the nozzle needle 24 is seated again on the valve seat 22, to interrupt fuel flow from the fuel passage 28 into the injection hole 23. Thus, the fuel injection is stopped.

When the coil 32 stops being energized, the biasing force f1 of the spring 37 moves the moving core 40 and the nozzle needle 24 toward the injection hole 23 against the biasing force f2 of the spring 45. When the seal portion 27 of the nozzle needle 24 is seated on the valve seat 22, the nozzle needle 24 rebounds toward the fixed core 33 due to the impact of collision. In this regard, the moving core 40 and the nozzle needle 24 can move relative to each other. Thus, even when the seal portion 27 of the nozzle needle 24 is seated on the valve seat 22, the moving core 40 keeps moving toward the injection hole 23 due to inertia, to separate the moving core 40 from the nozzle needle 24. Accordingly, the nozzle needle 24 is subjected only to the biasing force f1 of the spring 37, and a mass, onto which the biasing force f1 is applied, is decreased. As a result, an inertia force of a moving portion, which is formed of the moving core 40 and the nozzle needle 24, is decreased, so as to reduce the rebounding degree of the nozzle needle 24 toward the fixed core 33. Thus, when the coil 32 stops being energized, the fuel injection out of the injection hole 23 is rapidly stopped. Accordingly, the irregular fuel injection is reduced, and it is possible to control the injection quantity of the fuel injected out of the injection hole 23 with high accuracy.

As described above, the fuel injection valve according to the first embodiment is provided with the spring seat 50 for supporting the spring 45 on the injection hole (23)-side end portion of the cylindrical member 11. Thus, it is not necessary to provide the fuel injection valve 10 with a special member for maintaining the bearing of the spring 45, and it is possible to decrease parts. Further, the spring seat 50 is formed integrally with the cylindrical member 11 by bending a part of the cylindrical member 11. Accordingly, it is possible to simplify a construction and to reduce working processes of the fuel injection valve 10.

Further, in the fuel injection valve 10 according to the first embodiment, the spring 45, which is in contact with the spring seat 50 of the cylindrical member 11, pushes the moving core 40 toward the fixed core 33. Thus, the nozzle needle 24 is not provided with a special member for preventing excessive travels of the moving core 40 and the nozzle needle 24. Thus, it is not necessary to fix another member to the nozzle needle 24 by welding, etc. Accordingly, it is possible to reduce a deformation of the nozzle needle 24 due to thermal distortion, etc.

Furthermore, in the fuel injection valve 10 according to the first embodiment, the moving core 40 and the nozzle needle 24 can move relative to each other in the axial direction, and the biasing force f1 of the spring 37 differs from the biasing force f2 of the spring 45. Thus, a rebound of the nozzle needle 24 due to the collision of the moving core 40 with the fixed core 33, and a rebound of the nozzle needle 24 due to the collision of the nozzle needle 24 with the nozzle body 21 are reduced. In addition, the excessive relative motion of the moving core 40 and the nozzle needle 24 such as the overshoot of the nozzle needle 24 is prevented. Accordingly, even if the energizing time of the coil 32 is short, it is possible to reduce irregular fuel injections out of the injection hole 23, and to control the injection quantity of the fuel injected out of the injection hole 23 with high accuracy.

Second Embodiment

Figure 3:
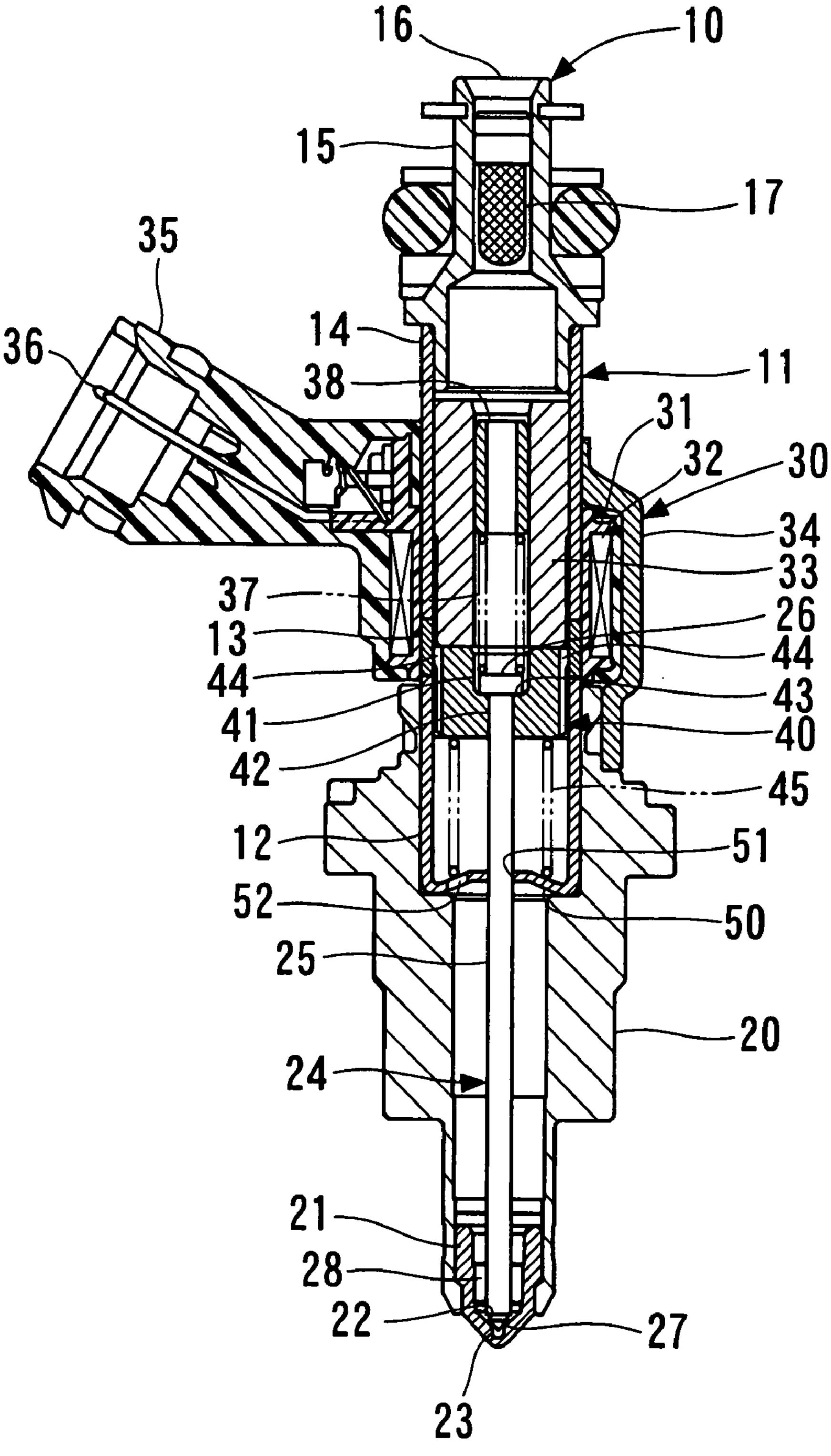
FIG. 3 is a cross-sectional view showing a fluid injection valve according to a second embodiment of the present invention.

FIG. 3 depicts a fuel injection valve 10 according to second embodiment of the present invention. In the second embodiment, components that are substantially equivalent to those in the first embodiment are assigned common reference numerals, and not especially described in the following.

As shown in FIG. 3, in the fuel injection valve 10 according to the second embodiment, a radially inner end portion of the spring seat 50, i.e., an inner circumferential surface 51 of the spring seat 50 is in contact with the shaft portion 25 of the nozzle needle 24. Thus, the inner circumferential surface 51 of the spring seat 50 serves as a guide portion that is in sliding contact with the shaft portion 25 of the nozzle needle 24. The movement of the nozzle needle 24 in the axial direction is guided by the inner circumferential surface 51 of the spring seat 50. The spring seat 50 has a fuel passage 52 that penetrates the spring seat 50 from the fixed core (33)-side surface to the injection hole (23)-side surface. Accordingly, the fuel flow through the spring seat 50 is secured regardless of the contact of the nozzle needle 24 with the inner circumferential surface 51 of the spring seat 50.

In the fuel injection valve 10 according to the second embodiment, the movement of the nozzle needle 24 in the axial direction is guided by the inner circumferential surface 51 of the spring seat 50. Thus, it is possible to adjust the movement of the nozzle needle 24 in the axial direction with high accuracy, without increasing parts of the fuel injection valve 10.

Third, Fourth, Fifth and Sixth Embodiments

FIGS. 4-7 depict fuel injection valves 10 according to third, fourth, fifth and sixth embodiments of the present invention. In the third, fourth, fifth and sixth embodiments, components that are substantially equivalent to those in the first embodiment are assigned common reference numerals, and not especially described in the following.

Figure 4:
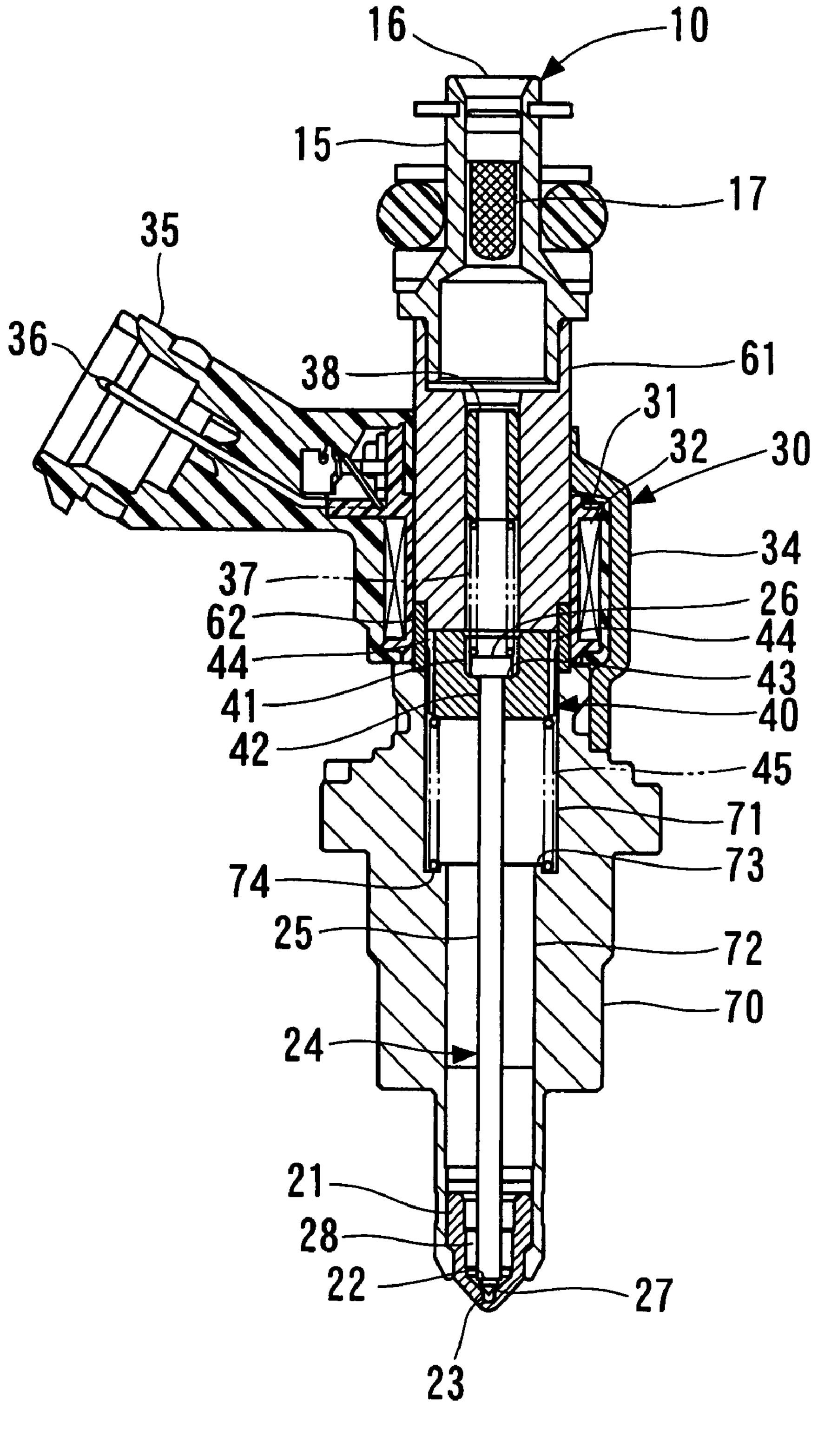
FIG. 4 is a cross-sectional view showing a fluid injection valve according to a third embodiment of the present invention.

As shown in FIG. 4, the fuel injection valve 10 according to the third embodiment is not provided with the cylindrical member 11 in the first embodiment. Thus, a fixed core 61 is installed inside the coil 32 to be in direct contact with the coil 32. Further, the spring 45, which pushes the moving core 40 toward the fixed core 61, is installed inside a nozzle holder 70. A nonmagnetic ring 62 prevents a magnetic short circuit between the fixed core 61 and the nozzle holder 70. In the fuel injection valve 10 according to the third embodiment, the fixed core 61, the nozzle holder 70 and the nonmagnetic ring 62 serve as the housing according to the present invention. The nonmagnetic ring 62 is installed between the fixed core 61 and the nozzle holder 70.

The nozzle holder 70 has a large diameter portion 71 and a small diameter portion 72. The large diameter portion 71 and the nonmagnetic ring 62 provide an inner circumferential surface that is in contact with the outer circumferential surface of the moving core 40. The spring 45 is installed inside the large diameter portion 71. One axial end portion of the small diameter portion 72 is in contact with an injection hole (23)-side end portion of the large diameter portion 71. A protruding portion 73 is formed in the boundary between the large diameter portion 71 and the small diameter portion 72. The protruding portion 73 cylindrically protrudes toward the fixed core 61. The protruding portion 73 is inserted into an inner circumference of the spring 45. Thus, the injection hole (23)-side end portion of the large diameter portion 71 serves as a spring seat 74 that is in contact with a counter moving core (40)-side end of the spring 45. By inserting the protruding portion 73 into the inner circumference of the spring 45, it is possible to prevent the spring 45 from being inclined and bent with respect to the inner circumference of the large diameter portion 71. Accordingly, it is possible to maintain the accuracy of the biasing force of the spring 45.

Figure 5:
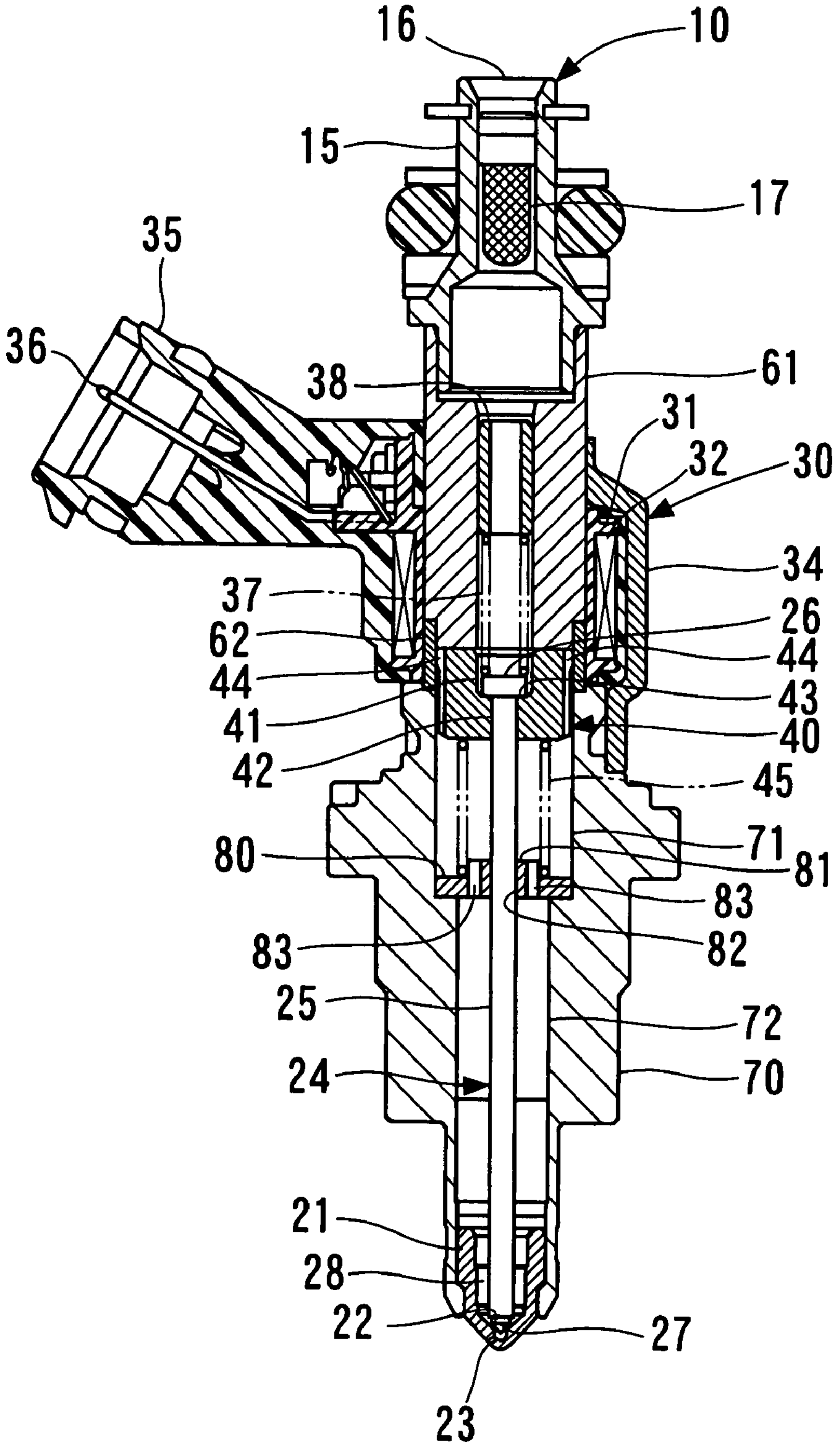
FIG. 5 is a cross-sectional view showing a fluid injection valve according to a fourth embodiment of the present invention.

As shown in FIG. 5, in the fuel injection valve 10 according to the fourth embodiment, a guide member 80 is installed on a small diameter portion (72)-side end portion of the large diameter portion 71. A counter moving core (40)-side end portion of the spring 45 is in contact with the guide member 80. That is, the guide member 80 provides a spring seat that supports one axial end portion of the spring 45. The guide member 80 has a protruding portion 81 that cylindrically protrudes toward the fixed core 61. The protruding portion 81 is inserted into an inner circumference of the spring 45. By inserting the protruding portion 81 into the inner circumference of the spring 45, it is possible to prevent the spring 45 from being inclined and bent with respect to the large diameter portion 71 of the nozzle holder 70. Accordingly, it is possible to maintain the accuracy of the biasing force of the spring 45.

Further, an inner circumferential surface 82 of the guide member 80, which includes an inner circumferential surface of the protruding portion 81, is in contact with the shaft portion 25 of the nozzle needle 24. Thus, the inner circumferential surface 82 of the guide member 80 serves as a guiding surface that is in sliding contact with the shaft portion 25 of the nozzle needle 24. Thus, the movement of the nozzle needle 24 in the axial direction is guided by the guide member 80. The guide member 80 has a fuel passage 83 that penetrates the guide member 80 from the fixed core (33)-side surface to the injection hole (23)-side surface. Accordingly, the fuel flow through the guide member 80 from the fixed core (33)-side to the injection hole (23)-side is secured regardless of the contact of the nozzle needle 24 with the inner circumferential surface 82 of the guide member 80.

Figure 6:
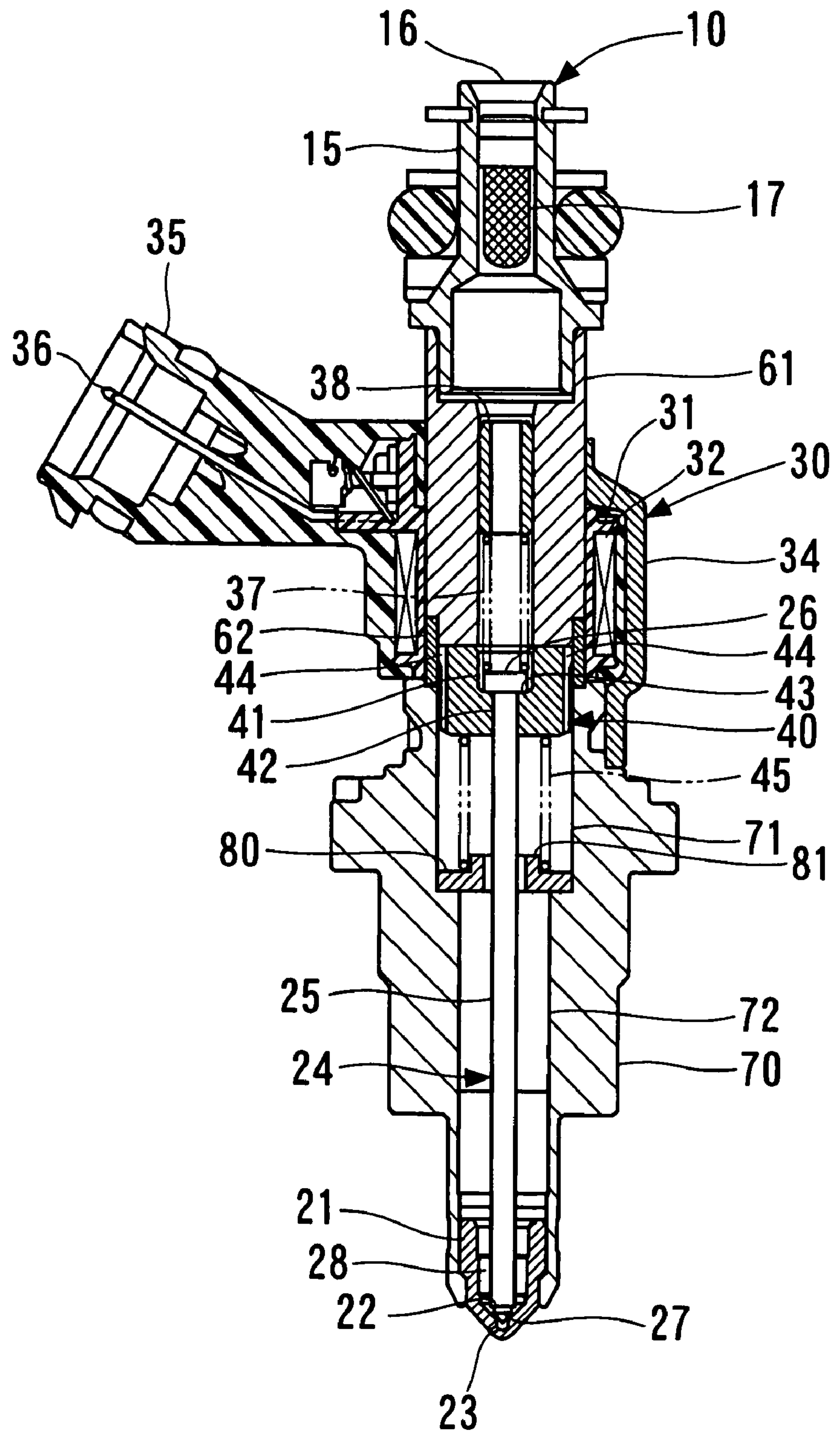
FIG. 6 is a cross-sectional view showing a fluid injection valve according to a fifth embodiment of the present invention.

As shown in FIG. 6, in the fuel injection valve 10 according to the fifth embodiment, the guide member 80 is not in contact with the shaft portion 25 of the nozzle needle 24. In this regard, the outer circumferential surface of the moving core 40 is in contact with the inner circumferential surface of the large diameter portion 71 of the nozzle holder 70. Thus, the movement of the moving core 40 is guided by the inner circumferential surface of the large diameter portion 71 of the nozzle holder 70 and by the inner circumferential surface of the nonmagnetic ring 62. The movement of the nozzle needle 24 is guided by the inner circumferential surface of the moving core 40. In this manner, in the fuel injection valve 10 according to the fifth embodiment, the movements of the moving core 40 and the nozzle needle 24 in the axial direction are guided by the moving core 40 and the nozzle holder 70.

Figure 7:
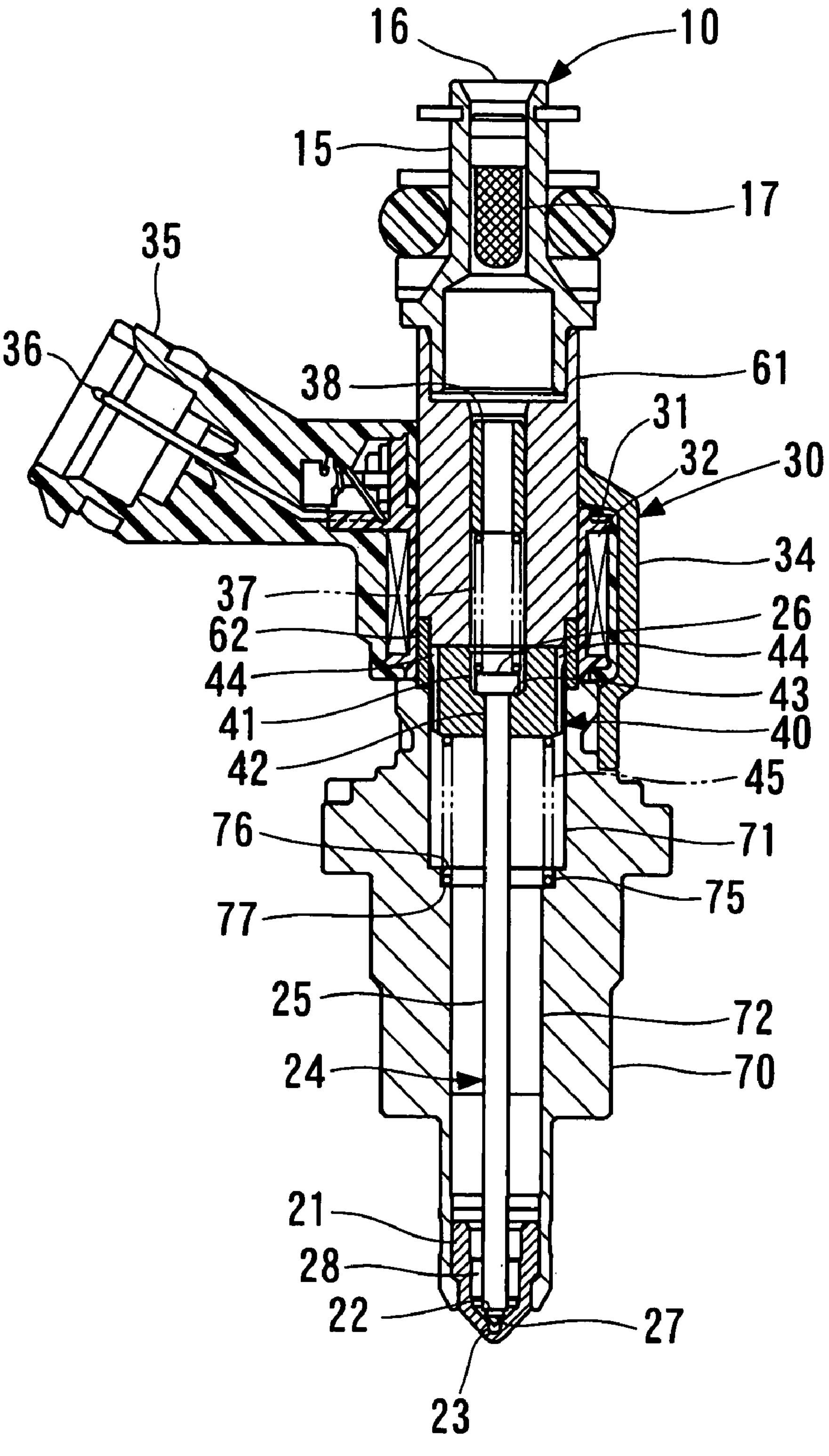
FIG. 7 is a cross-sectional view showing a fluid injection valve according to a sixth embodiment of the present invention.

As shown in FIG. 7, in the fuel injection valve according to the sixth embodiment, the nozzle holder 70 has a middle diameter portion 75 between the large diameter portion 71 and the small diameter portion 72. An inner diameter of the middle diameter portion 75 is smaller than an inner diameter of the large diameter portion 71 and larger than an inner diameter of the small diameter portion 72. The spring 45 is inserted into an inner circumference of the middle diameter portion 75. Thus, an injection hole (23)-side end portion of the large diameter portion 71 serves as a spring seat 77 that is in contact with a counter moving core (40)-side end portion of the spring 45. By inserting the spring 45 into the inner circumference of the middle diameter portion 75, an inner circumferential surface 76 of the middle diameter portion 75 of the nozzle holder 70 prevents the spring 45 from being inclined and bent with respect to the large diameter portion 71 of the nozzle holder 70. Accordingly, it is possible to maintain the accuracy of the biasing force of the spring 45.

Other Embodiments

In the above-described fuel injection valves 10 according to the first to sixth embodiments, the spring seat 50, 74 or the guide member 80 is installed on the injection hole (23)-side end portion of the cylindrical member 11 or the injection hole (23)-side end portion of the large diameter portion of the nozzle holder 70. Alternatively, it is possible to provide a spring seat between the injection hole (23)-side end portion of the moving core 40 and the injection hole (23)-side end portion of the cylindrical member 11, or between the injection hole (23)-side end portion of the moving core 40 and the injection hole (23)-side end portion of the large diameter portion 71.

In the fuel injection valves 10 according to the first and second embodiments, the cylindrical member 11 is formed of the first magnetic portion 12, the nonmagnetic portion 13 and the second magnetic portion 14. Alternatively, it is possible to form the cylindrical member 11 integrally of a thin-walled magnetic material or thin-walled nonmagnetic material. When the cylindrical member 11 is integrally formed of thin-walled magnetic material, magnetic flux passing from the moving core 40 to the fixed core 33 through the thin-walled magnetic material is instantly saturated. Thus, it is possible to reduce a leakage of the magnetic flux from the moving core 40 to the fixed core 33, and it is possible to secure enough magnetic attraction force generated between the fixed core 33 and the moving core 40. When the cylindrical member 11 is integrally formed of thin-walled nonmagnetic material, magnetic flux smoothly passes from the magnetic plate 34 to the fixed core 33 through the thin-walled the cylindrical member 11. Thus, even though a cylindrical member 11, which is formed of nonmagnetic material, is interposed between the magnetic plate 34 and the fixed core 33, it is possible to secure enough magnetic flux penetrating through the cylindrical member 11. Accordingly, it is possible to secure enough magnetic attraction force generated between the fixed core 33 and the moving core 40.

This description of the invention is merely exemplary in nature and, thus, variations that do not depart from the gist of the invention are intended to be within the scope of the invention. Such variations are not to be regarded as a departure from the spirit and scope of the invention.

What is claimed is:

1. A fluid injection valve comprising:

a valve housing;

a valve needle that is installed in the valve housing to be slidable in an axial direction thereof;

a fixed core that is fixed to the valve housing;

a moving core that is installed in the valve housing to be slidable in the axial direction and provided with a through hole in which the valve needle is slidably inserted;

a coil that is fixed to the valve housing to generate magnetic force to attract the moving core toward the fixed core when it is energized;

a stopper that is provided on a circumference of the valve needle at a position between the fixed core and the moving core, the stopper coming in contact with the moving core to move the valve needle integrally with the moving core when the moving core travels toward the fixed core with respect to the needle valve;

an elastic member that generates a biasing force in the axial direction to bias the valve needle away from the fixed core;

a helical spring that generates a biasing force in the axial direction to bias the moving core toward the fixed core, the biasing force generated by the helical spring being smaller than the biasing force generated by the elastic member; and a spring seat that supports one axial end of the helical spring, which is opposite from the moving core, in both of the axial direction and a radial direction of the helical spring, an opposite axial end of the helical spring engaging the moving core to bias the moving core towards the fixed core, wherein the spring seat is provided on an inner circumference of the valve housing, the inner circumference of the valve housing has:

a large diameter portion that accommodates the moving core and the helical spring therein;

a small diameter portion that is located on an opposite side of the large diameter portion from the fixed core, and in which an inner diameter of the valve housing is smaller than in the large diameter portion;

a middle diameter portion that is located between the large diameter portion and the small diameter portion, and in which an inner diameter of the valve housing is smaller than in the large diameter portion and larger than in the small diameter portion; and a step that is located between the middle diameter portion and the small diameter portion supporting the one end of the helical spring in the axial direction and an inner circumference of the middle diameter portion supporting the one end of the helical spring in the radial direction to serve as the spring seat, the valve housing includes a nozzle holder and a non-magnetic ring, the non-magnetic ring being disposed between the fixed core and the nozzle holder for preventing a magnetic short circuit between the fixed core and the nozzle holder, and the outer circumferential surface of the moving core is in contact with the inner circumferential surface of the large diameter portion of the nozzle holder, whereby the movement of the moving core is guided by the inner circumferential surface of the large portion and the inner circumferential surface of the non-magnetic ring.

* * * * *